Patented June 22, 1937

2,084,747

UNITED STATES PATENT OFFICE 2,084,747

OPAQUE LEAD GLASS OF LOW MELTING-POINT

Jacob E. Rosenberg, Pittsburgh, Pa., assignor to The O. Hommel Company, a corporation of Pennsylvania No Drawing. Application August 17, 1934, Serial No. 740,361

3 Claims. (Cl. 106—36.1)

This invention relates to lead glasses of low melting-point, and consists in an opacified glass and in the method of its preparation.

There are certain vitreous preparations, not commonly called glasses, though properly to be classed as such, that, by virtue of specific composition, are of low melting-point, and that have, because of their low melting-points, specific values and uses in industry. They include in their composition lead compounds. Other particular ingredients give to one and another of these preparations characteristics suited to one and another special use, but all contain as a substantial and characteristic ingredient a compound of lead. The lead compound is ordinarily produced in manufacture, by smelting a batch of materials that includes both lead oxide and other glass-forming material. One such preparation, or class of preparations, termed in industry frits, is used for coating with enamel articles of cast-iron, and articles of low melting-point metals, such as copper and silver. The melting-point of the frit in such case is 1200°–1300° F. Other such preparations are termed fluxes, and these are used for surface decoration upon articles of glassware, and articles of steel bearing as an enamel coating a glass of higher melting-point than is usual in the coating of articles of the metals previously named. For the decoration of an article of glassware, manifestly, the flux must mature at a temperature below the point at which the article itself begins to soften; for, otherwise, the article would become misshapen in firing. The melting-point of such flux is about 1000°–1100° F. These various preparations, for whatever specific purpose intended, I shall here characterize generically as low melting-point lead glasses.

Articles of glassware—drinking glasses, articles of steel coated with glass and commonly called "enamel ware", and the like—are decorated by applying to the surface in desired pattern suitably pigmented, vitrifiable flux, and then firing. In the firing operation the flux is melted and by melting is caused to adhere to the surface of the glass, and on cooling the flux material solidifies to a glaze upon the surface of the article. Manifestly the flux must be so compounded as to mature, that is to say, to fuse and to come to proper condition of fluidity, at a temperature lower than the softening point of the glass of the article to whose surface it is applied; for if this were not so, the glass article would soften and lose shape under the heat of firing. In the compounding of these fluxes, lead oxide and boric oxide are commonly melted together to form lead borate, a suitable vitrifiable material of low melting-point (approximately 1000° F.)

In the preparation of opaque lead fluxes, for the surface decoration of articles of glassware, and in the preparation of opaque frits for the coating of cast-iron articles (for example), it is desirable to find an opacifying agent that shall afford whiteness without tinge, that shall afford opacity in any desired degree without diminution in smoothness and brilliance of surface finish, that shall lend itself freely to the normal operations of preparation, application, and firing, and that shall be inexpensive.

In surveying the field of theoretically possible opacifying agents, arsenic has commonly been passed over, on the ground of impracticability; for, while it is true that the familiar trioxide of arsenic is white, it sublimes at low temperature, and it would seem to be, and indeed is, on that account itself unsuitable.

I have discovered of the lead salts of arsenic (both the arsenate and the arsenite), not only that they are white and stable and to that extent suitable as opacifying agents for lead fluxes, but I have further discovered a particular procedure by following which lead arsenate may be rendered cheaply and satisfactorily serviceable for the purpose stated.

The normal, and ordinarily the preferable, way of introducing an opacifier into a lead flux, for example, is to grind it with the flux to a powder. To this powder oil or water is added, to form a paste or slip, and in the form of such paste or slip the material is applied to the glass surface. And firing follows. Arsenic acid is tribasic, and forms three series of salts, and of the arsenates of lead the ortho-arsenate ($PbHAsO_4$) is a cheap and common article of commerce. (It is widely used as an insecticide.) I have in experimentation added the ortho-arsenate of lead to previously prepared flux, in like manner as oxides (such as the oxide of tin) commonly are added, and have ground the material and applied it and fired the article in usual manner, and have found that the result is not satisfactory. I have perceived that, under the heat of firing, the ortho-arsenate gives up water, tending to become the pyro-arsenate ($Pb_2As_2O_7$). While in this form the opacifying value and effect of the arsenate are none the less, the release of water is a disturbing circumstance. In order to gain an ultimate smooth and unbroken surface, the firing temperature must, because of such release of water, be maintained and the firing operation prolonged; and thus there is introduced into the procedure a technical refinement that involves skill, and the consequence is an increase in cost of production.

I have found that, by adding the arsenate to the flux in the form of pyro-arsenate, the normal procedure may be followed without complication and will lead to successful results, and this discovery of mine I regard as the first feature and characteristic of my invention. This discovery, however, is attended by the embarrassment that the pyro-arsenate must first be prepared; and the preparation of the pyro-arsenate from the ortho-arsenate adds an item of expense to the cost of operation as a whole.

My further discovery lies in this, that, if the arsenate of lead be introduced, not as a mill addition to the previously prepared flux, but, in the cheap and readily available form of ortho-arsenate, as a component of the batch from which the flux is smelted, the arsenate (in whatever particular form it be) will continue in the flux and will have opacifying effect, and the firing of the decorated article will be attended with no such embarrassment as that described above. The flux with which the arsenate has so been smelted will be ground and mixed and applied and fired, all in normal manner.

I have found that lead arsenite ($PbAsO_2$) also will afford the desired opacification.

I have further found that the arsenate (or arsenite) may be produced in the flux by adding to the flux-forming batch an arsenate in other combination than, specifically, lead arsenate (or arsenite). It may be added as the arsenate (or arsenite) of another base, a base that in the smelting operation will give place to lead (one of the ingredients of the batch), with the formation in the molten batch of the desired lead arsenate. Choice here will be limited to those bases which, released in the reaction indicated, have no disadvantageous effect upon the flux. For example, sodium arsenate (or arsenite) may be added. The lead in the batch material reacts to form lead arsenate, with the release of sodium. The sodium in turn enters into the composition of the batch. And if, in anticipation of this, the batch be particularly compounded, sodium arsenate (or arsenite) will be found to be an acceptable material.

Another and preferable material is ammonium arsenate. The lead reaction indicated releases the ammonium radical, and this passes off in the form of gas.

A typical batch formula is—

| | Parts |
|---|---|
| Red oxide of lead | 78 |
| Silica | 12 |
| Boric acid | 24 |

The melting point of this batch is 1000°–1100° F. To such a batch, lead ortho-arsenate (or, alternatively, ammonium ortho-arsenate) may be added in desired ratio. I have found ratios ranging from 1:20 to 1:5 to be satisfactory, but do not intend to limit the practice of my invention to ranges of particular numerical value. The particular ratio will be determined by the degree of opacity desired. Delicate tints often are desired, in the parlance of the art, "pastel shades." These are attained by white opacifier, employed in quantity sufficient to give translucence rather than full opacity, together with a pigment of desired color and, ordinarily, in small quantity.

On the other hand, there always is a demand for a white lead flux of maximum opacity, and to meet this demand the general procedure last described may advantageously be followed. That is to say, the opacifying agent in maximum ratio may be introduced in the compounding of the batch from which the flux is smelted, and may be smelted with the batch. To satisfy, however, particular and peculiar specifications, the ortho-arsenate of lead may by calcining be converted into the pyro-arsenate and in so-converted form the arsenate may be incorporated, as a mill addition, with previously smelted and otherwise unopacified flux.

I have perceived that in the same group with arsenic—that is to say, in the fifth group of the periodic table of elements—there are other elements that form with lead salts that are white and that are thermally stable under the operations of preparing the flux and firing the decorated article; and, specifically phosphorus and vanadium afford such salts. Lead vanadate, to be sure, though white, is of yellowish cast; but it is applicable and serviceable where clear white is not required, and in those cases where added color affords desired tints.

In surveying the field of theoretically possible opacifying agents, phosphorus has commonly been passed over, on the ground of impracticability; for, while it is true that phosphorus oxide ($P_2O_5$) is white, it is capable of being produced only as a laboratory experiment. It has great avidity for water, and goes over at once to phosphoric acid. This acid is a heavy liquid, manifestly unsuitable for purposes such as those here in contemplation.

I have discovered of lead phosphate, not only that it is white and stable, and to that extent suitable as an opacifying agent for lead fluxes, but I have further discovered that it is serviceable if the general procedure already described in connection with lead arsenate be followed.

Phosphoric acid forms a plurality of series of salts, and of the lead phosphates the ortho-phosphate, $Pb_3(PO_4)_2$, alone is available. I have found that if the ortho-phosphate of lead be introduced, not as a mill addition to the previously prepared flux, but as a component of the batch from which the flux is smelted, the phosphate will continue, and will have opacifying effect. The flux with which the phosphate has so been smelted will be ground and mixed and applied and fired, all in normal manner.

I have found that if, instead of lead phosphate $Pb_3(PO_4)_2$, lead hypo-phosphite, $Pb_2P_2O_6 + 10H_2O$, be included with the other materials in making up the batch, the phosphite will in the ensuing smelting operation, taking up oxygen, go over to the phosphate and serve the described purpose.

I have further found that the phosphate (or phosphite) may be added to the flux-forming batch as the salt of another base than lead, and that in the smelting operation the lead otherwise present in the batch will react, displacing such other base, and forming the desired lead phosphate, analogously to the behavior of the arsenates already described.

Of the vanadate nothing more need be said than that it also may be employed satisfactorily in the manner described.

What I have said about the preparation of fluxes is true and applicable in the cases of other low melting-point lead glasses, and specifically in the case of the frit used for enameling articles of cast-iron. The melting-point of such a frit is about 1300° F. And in the ensuing claims I characterize the glasses of my invention, including frits and fluxes, whose melting point in no case exceeds 1400° F., as low melting-point glasses.

I claim as my invention:

1. A low melting-point lead glass smelted from a batch of which lead oxide is by weight the major component and whose melting-point does not exceed 1400° F., in which there is additionally present an opacifying content of lead phosphate.

2. A low melting-point lead glass smelted from a batch of which lead oxide is by weight the major component and whose melting-point does not exceed 1400° F., in which there is additionally present an opacifying content of lead arsenate.

3. A low melting-point boro-silica lead glass composition comprising an opacifying content of lead phosphate.

JACOB E. ROSENBERG.